United States Patent [19]

Toriya et al.

[11] Patent Number: 5,438,327
[45] Date of Patent: Aug. 1, 1995

[54] MULTI-CAPCODE COMMUNICATION RECEIVING EQUIPMENT

[75] Inventors: Michio Toriya, Ichikawa; Tateo Masaki, Sakura, both of Japan

[73] Assignee: Uniden Corporation, Ichikawa, Japan

[21] Appl. No.: 936,207

[22] Filed: Aug. 27, 1992

[51] Int. Cl.⁶ .................. H04Q 7/16; G08B 5/22
[52] U.S. Cl. ................. 340/825.52; 340/825.44
[58] Field of Search ........... 340/825.26, 825.27, 340/825.44, 825.47, 825.52, 825.53; 379/62; 455/32.1

[56] References Cited

U.S. PATENT DOCUMENTS

| | | | |
|---|---|---|---|
| 4,887,075 | 12/1989 | Hirasawa | 340/825.52 |
| 4,894,649 | 1/1990 | Davis | 340/825.44 |
| 5,025,252 | 6/1991 | DeLuca et al. | 340/827.27 |
| 5,049,874 | 9/1991 | Ishida et al. | 340/825.27 |
| 5,241,305 | 8/1993 | Fascenda et al. | 340/825.44 |

Primary Examiner—Donald J. Yusko
Assistant Examiner—Mark H. Rinehart
Attorney, Agent, or Firm—Oblon, Spivak, McClelland, Maier, & Neustadt

[57] ABSTRACT

Upon receipt of address data which matches one of a given plurality of capcodes, this pager executes a paging service corresponding to the matching capcode; this pager is characterized in that any capcode or capcodes specified as being invalid are replaced with a capcode or capcodes specified as being valid based on valid/invalid flags each corresponding to respective one of the capcodes.

9 Claims, 5 Drawing Sheets

MULTI-CAPCODE COMMUNICATION RECEIVING EQUIPMENT

BACKGROUND OF THE INVENTION

1. Field of the Invention

This invention relates to multi-capcode communication receiving equipment which contains a receiver that receives a radio signal and demodulates a data stream including address data, has a plurality of self-call numbers or identification numbers, normally called capcodes, and which, when the demodulated address data matches one of the capcodes, executes a specific service corresponding to that capcode, and more particularly to a multi-capcode pager with a receiver which is a selectively activated receiver and which executes a paging service or services corresponding to the capcodes.

2. Description of the Prior Art

One of the protocols widely used for data transfer in pager systems is called the POCSAG coding protocol. FIG. 1 illustrates a data stream under this protocol, sent from a transmitting station to a subscribing pager on electromagnetic radiation or a radio signal of a prescribed frequency. The data stream starts with a preamble data stream of 576 or more bits, comprising a sequence of alternating bits, 1010 . . . 10. This preamble is followed by an arbitrary number of data batches numbered 1, 2, 3, . . . Each data batch commences with a predetermined synchronization data or code Sc, followed by eight data frames numbered #0 through #7. Each data frame consists of two code words, each of which is 32 bits.

The allocation of the bits in each data frame in the POCSAG format is illustrated in FIG. 2. The first bit (bit #1) in each of the code words 10 and 20 is an address/message flag 11 or 21. As illustrated by address/message flag 11, when the logical value of this bit is '0' then that code word is an address code word. As illustrated by address/message flag 21, when the logical value of this bit is '1' then that code word is a message code word. In the address code word 10, the 18 bits from bit #2 to bit #19 are used as address data 12 for paging only those pagers which have the same capcode. The next two bits #20 and #21 are used as function data 13, taking values of '00', '01', '10', or '11' in order to indicate one of four functions. The group of bits from #22 to #31 is called the Bose-Chaudhuri-Hocquenghem (BCH) code, and the last bit #32 is a parity bit (especially an even parity bit).

In contrast, if the 32-bit code word is a message code word, namely if the logical value of the address/message flag (bit #1) is '1', then the subsequent bits from bit #2 to bit #21 are used to represent message data 22, and the remaining bits from bit #22 to bit #32 are error correction bits comprising a BCH code 23 and a parity bit 24. The POCSAG coding protocol does not limit the length of a message, so if the message is long, then the code words of the next and subsequent data frames can be used as continuation message code words. Message code words can also be placed in the data frames following the synchronization code Sc of the next and subsequent batches.

In the field of binary information transmission, this use of the BCH codes 14 and 23, and the parity bits 15 and 24 is a common-knowledge technique for correcting errors and confirming the success or failure of the correction. This technique has no direct relevance to this invention, so we shall omit a detailed explanation of this technique.

Modern pagers which comply with the POCSAG transmission format are given a plurality of mutually differing capcodes. These capcodes are stored in a capcode memory for each pager. The capcode memory constitutes one portion of a programmable read-only memory (PROM) or, more recently, especially an electrically erasable PROM (EEPROM). For example, in a pager that may use up to three capcodes 1, 2, and 3, the first capcode 1 is stored in the first capcode memory slot 1 within the capcode memory, the second capcode 2 in the second capcode memory slot 2, and the third capcode 3 in the third capcode memory slot 3.

Since a pager is a battery-driven portable unit that must be used for long periods, the POCSAG format includes various means of reducing power consumption for the purpose of battery conservation. Like other types of radio receiving equipment, a pager comprises a receiver that receives and demodulates a radio signal of a prescribed frequency which excites its antenna, and a wave shaper or digital detector that modifies the waveform of the demodulated output of the receiver such that it can be read as a digital signal. To reduce battery consumption, battery power is provided only intermittently at a time interval $\Delta T$ to at least these two components, or to just the receiver. With recent trends toward the use of a microcomputer as a pager controller, in such a case, the operating mode of the microcomputer is also modified so that when the power supplied to the receiver or receiver and wave shaper is reduced, the operating mode of the microcomputer is changed to low clock mode in which the clock frequency is lowered.

Referring to FIG. 1 once again, observe that the receiver mode is also included. In the diagram, the periods when the mode of a selectively activated receiver is indicated to be 'on' are periods when the receiver is in a stable activated state after battery power is applied to it. In contrast, the periods in which the mode is 'off' are periods in which the receiver is deactivated. Putting the receiver into the off mode is typically referred to as turning the pager off, and putting the receiver into the on mode as turning the pager on. The receiver goes into the on mode periodically at a time interval $\Delta T$, and if the preamble is not detected during a prescribed time that the on state should last, the receiver goes into the off mode after this prescribed time has elapsed, waits until the time interval $\Delta T$ has elapsed and then goes back into the on mode. If the preamble is detected while the receiver is on, as shown in FIG. 1, the receiver will remain in the on mode and receive the synchronization data or code Sc sent next. After synchronization is established, the receiver goes into the off mode until the data frame previously assigned to that pager (say data frame #4) is sent. After sufficient time has elapsed to receive frame #4, the receiver goes into the on mode. The receiver remains in the on mode until it has received, demodulated, and decoded the data in frame #4 or, if necessary, the data in subsequent data frames (if the message is long). Then, the receiver goes again into the off mode.

This POCSAG format is planned such that the capcode or capcodes given to a pager determine which frame that pager is to look at. Namely, in the POCSAG format, any number in the range from decimal 0 to 2097152 ($=2^{21}$), excluding some special codes, can be used as a capcode. As shown in FIG. 2 and as described later, the address data 12 to be compared against each capcode is only 18 bits long. This is because the least-significant three bits are used to determine the frame. Namely, the least-significant three bits represent binary values from '000' to '111' or decimal values from '0' to '7'. When one pager is given multiple capcodes, by making sure that the least-significant three bits all have the same value, the most-significant 18 bits can be used to determine the capcodes, yet the capcodes will all correspond to the same frame. In other words, to give multiple capcodes to a pager and limit the frame to #4, each capcode to be assigned must be a number between decimal 8 and 2097152, and should be selected such that when divided by 8, it gives a remainder of 4. A concrete example would be the numbers 12, 20 and 28. Naturally, the reason for assigning all of the capcodes to the same frame is to make the most of the battery conservation facilities described above. If each capcode required that a different frame to be checked, this would require the receiver to maintain the on mode for a longer period, reducing battery life. Note that while the POCSAG coding protocol does not stipulate this directly, the numbers from decimal 0 to 7 are not normally used as capcodes. The reason for this is because it would raise the possibility of all bits in address code word 10 becoming '0', and if this occurs, the risk of malfunction is very high.

Thus, in order for the pager to implement the battery-saving operation as intended by the POCSAG format, a decoder provided within the pager finds the frame (frame #4 for example) assigned to that individual pager, finds the first code word in that frame in which the logical value of bit #1 of the code word is '0' (namely the address code word 10 in which the address/message flag 11 is '0'), and compares the address data 12 in bits #2 to #19 of the address code word 10 against all of the capcodes assigned to that pager. Then, if the address data 12 does not coincide or match any of the capcodes, the receiver goes into the off mode, waits until the time interval $\Delta T$ has elapsed and then goes back into the on mode. If the address data 12 provided as input to the decoder does coincide or match one of the capcodes given to the pager, then the pager will continue its operation for the purpose of executing the prescribed service.

It will be understood that "matching" as used herein refers not only to strict one-to-one identity, but also to broader types of correspondence, including look-up tables, and other comparison means.

The function data 13 may take one of four values, each of which represents one of the functions A, B, C, or D. For example, if function data 13 has a value of '00', this may indicate function A in which the speaker called a beeper may beep with a pattern of two long beeps, and when message data is displayed on a display as described hereinafter, the letter "A" may appear at a prescribed position on the display. If function data 13 has a value of '01', this may indicate function B in which the beeping pattern is one short beep followed by one long beep and the letter "B" may appear at the prescribed position on the display. Similarly, if function data 13 has a value of '10', this may indicate function C in which the beeping pattern is three short beeps and the letter "C" may appear at the prescribed position on the display, and if function data 13 has a value of '11', this may indicate function D in which the beeping pattern is four short beeps and the letter "D" may appear at the prescribed position on the display. Functions A through D may also be used for other purposes, such as for control data used for "over-the-air" remote programming in which data within the pager is rewritten using radio signals from the transmitting station. However, these functions have no direct relevance to this invention, so a detailed description is omitted.

When the decoder determines that the received address data matches one of the plurality of capcodes assigned to the pager, the decoder starts the microcomputer in high clock mode (naturally, this operation does not occur in models which do not change the clock mode), receives the second code word which is the message code word 20 (in which the bit value of address/message flag 21 is '1'), and decodes the message data 22. In this decoding process, the BCH code 23 and parity bit 24 are also used in the common-knowledge method to correct decode errors and confirm the success or failure of the correction. The validated message data is placed in the message memory under the control of the microcomputer. As described briefly above, if the message is long, data from the next and subsequent frames, and data from frames in subsequent batches, is decoded sequentially and placed in the message memory.

In this manner, when the reading and transfer of message data is complete, of the plurality of alert means typically provided, the prescribed alert means is actuated. When the pager includes a beeper, the beeper will beep in the manner determined previously by the function data 13, notifying the user that a new message has arrived. Depending on the model of pager, the messages stored in message memory may be displayed on the display immediately when alert means is actuated, but normally, the user must manipulate one or more of the input keys provided on the pager to display the message. Alternately, a certain input key must be manipulated in a certain manner to read the message from message memory and display the message on a numeric or alphanumeric display. Many of the latter types of pagers display a letter "A" through "D" corresponding to the function data 13 in a prescribed position on the display.

The basic types of alert means include light-emitting diode-based visual display means, vibrators which use motors to generate vibrations, and the beepers described above. Some pagers may include all of these alert means, with the information used to determine the alert means being stored in PROM or EEPROM provided in the pager, so that the user is able to specify the alert means to be used. However, some pagers may include only a beeper and vibrator. This too has no direct relevance to the present invention, so no further explanation will be presented. Moreover, the message memory area is now normally large enough to store a plurality of messages, permitting additional functions such as reporting the order of arrival of a message when displaying the message on the display, or displaying the most recent messages in order according to the order of arrival. However, this too has no direct relevance to the present invention, so no detailed explanation will be presented.

As described above, when the process of storing message data in the message memory is complete, the receiver goes into the off mode, and turns on periodically at a time interval $\Delta T$, until the next preamble is detected.

Each of the plurality of capcodes given to a single pager is reserved to perform a specific function. For example, assuming that three capcodes 1, 2, and 3 are provided, the first capcode 1 is allocated to only a single pager. Accordingly, when address data matching this capcode is received from the transmitting station, the alert means to be actuated (that to be paged) is on that pager only. For this reason, this capcode 1 is called the "individual call" capcode. In contrast, the pagers of persons of a certain group, e.g., employees of the same company, can be given the same capcode in the second capcode 2, so that all of these pagers can be paged at the same time by sending address data which matches this capcode 2. Accordingly, this capcode 2 is called the "group call" capcode. In addition, the third capcode 3 is similar to the individual call capcode in that there is one code used exclusively for each pager, but when a pager is paged with address data matching this capcode 3, a special alert means is employed, e.g., the beeper makes a different beep sound, or the letter "U" may appear at a prescribed position on the display. For this reason, this capcode 3 is called the "urgent call" capcode. In addition to these, many other paging services can be provided at additional cost, one example being the service known as the mail-drop service. A concrete example of this service is an experiment in which changes in stock market conditions are periodically or continuously displayed on the display. Naturally, each service must be assigned a capcode used exclusively for that service, requiring modern pagers to be able to accept between four and six capcodes. The number of capcodes required will probably increase in the future.

However, when considering such multi-capcode pagers, particularly when considering services provided at additional cost, the service provider must be able to differentiate paying customers from non-paying customers reliably. Even among the existing services, the individual call, group call, and urgent call described above, some customers may not want the group call service, for example. In this case, a scheme in which the hardware of each pager is modified to change the number of capcodes would be so unrealistic from a manufacturing and economic standpoint that it would be essentially impossible. If all pagers have the exact same hardware and software configuration, some scheme must be implemented to prevent the use of undesired capcodes. Such a scheme in the prior art is described below.

Here, we shall assume that the capcode memory contains three capcode memory slots, and among the three capcodes 1, 2, and 3 stored therein, capcode 1 is for the individual call service, capcode 2 is for the group call service, and capcode 3 is for the urgent call service. As described above, users who desire all of the services would have capcodes 1, 2, and 3 assigned to binary number values corresponding to different decimal numbers which give the same remainder when divided by 8. For example, to assign a pager to frame #0, decimal values such as capcode 1=80, capcode 2=983040, capcode 3=24000 can be assigned, giving remainders of 0.

In contrast, a user who does not desire the group call service may have the capcode 2 assigned to that user set to a number greater than decimal 2,000,000. Namely, in the above example, by changing the value of capcode 2 from the decimal value "983040" used to receive the group call service, capcodes such as capcode 1=80, capcode 2=2031616, capcode 3=24000 can be assigned to eliminate the group call service.

This technique was permitted because up until very recently, there had been no example of 2 million or more decimal values being used for capcodes. In fact, the number of pagers used on a single broadcast frequency is no more than 50,000 to 60,000 at most, so the numerical range of capcodes usable in the POCSAG format (8 to 2097152) provides sufficient margin. For this reason, making the numbers greater than 2 million unusable caused no problem at all, so by writing these unusable capcodes as capcodes for services that are not to be used, it was thought that address data matching these capcodes would not be sent, even by mistake.

However, since the POCSAG format has no intrinsic restrictions on the use of address data, some transmitting stations do use address data having values of 2,000,000 or greater, for testing or the like, engendering the risk of these pagers reacting in error. Even if this were not the case, the use of "unusable" address data with the expectation that it will not be used is intrinsically not desirable. For example, even though data is error-correctable by means of the BCH code, data errors consisting of three or more bits will not be corrected. For this reason, there is no guarantee that the address data which is correctly the decimal value 983040 in the example above will not be misread as 2031616. In this manner, it is dangerous to write a capcode corresponding to address data in the usable numerical range even if it is not actually used as address data, again engendering the risk of these pagers reacting in error. For unused capcodes, it is also not possible to send no data to the comparator within the decoder. If this were done, the address data might be misread as a capcode in the range from decimal 0 to 7 (the capcodes in which the most-significant 18 bits of the total 21 bits are all zeroes) or as a message code whose bits are all set to '1'.

In addition, in the conventional method, when users who had previously felt that a service was unneeded would change their minds, they would need to bring their pagers into the company managing the transmitting station and have them rewrite the capcodes. Alternately, the "over-the-air" reprogramming method described above could be used to rewrite the capcode corresponding to that service. In either case, the entire capcode must be rewritten. Speaking in concrete terms, take the pager with capcode 2=2031616 written to its memory in order to disable the use of the group call service in the example above. In order to make the group call service usable by this pager, the memory must be rewritten with capcode 2=983040. If this process is performed using the latter "over-the-air" reprogramming method, this invites increased complexity in the data processing.

It is therefore one object of the present invention to provide: in communication receiving equipment comprising a selectively activated receiver having a plurality of capcodes or identification numbers, whereby when address data which matches one of the capcodes is decoded, specific services corresponding to the capcode are executed, a method of reliably and easily preventing the reception of a specific service or services from among all services which may be executed, without any of the drawbacks of the prior art example give above.

In a multi-capcode pager which has n capcode memory slots for storing n capcodes numbered from 1 to n, where n is a positive integer greater than or equal to 2, whereby received and demodulated address data is compared against all of the capcodes numbered from 1 to n; such that if this address data matches any of the n capcodes, the pager can execute a prescribed paging service corresponding to the matching capcode; in such a pager, of m types of paging services numbered from 1 to m (m≦n), if certain service or services are not to be executed for an individual pager, even if address data matching the capcode or capcodes actually stored in the capcode memory slot or slots corresponding to the service or services, another object of the invention is to provide a simple and reliable method of blocking the execution of the service or services. Note that herein, we are not limited to the case in which m=n, but the case in which m<n is included, as this includes cases in which a plurality of capcodes corresponding to the same service.

Another object of the invention is to provide, in addition to the simple and reliable method of blocking the selected service or services described above, a simple and reliable technique for restoring those service or services which had been blocked.

SUMMARY OF THE INVENTION

This invention achieves these objects by, for example, providing a multi-capcode pager containing: a selectively activated receiver that receives a radio signal and demodulates a data stream including address data, a capcode memory that stores a plurality of capcodes, and a decoder that compares the demodulated address data against all of the plurality of capcodes and generates a coincidence signal when the address data matches one of the capcodes, and, as each of a plurality of paging services to be executed corresponds to at least one specific capcode, if the demodulated address data matches one of the plurality of capcodes, executes the paging service corresponding to the matched capcode, comprising the improvements whereby: a valid/invalid flag memory is provided in a separate memory area from the capcode memory such that valid/invalid flags that indicate whether each of the capcodes is valid or invalid may be written therein; transfer means is further provided to transfer the plurality of capcodes from the capcode memory to the decoder for comparison with the address data; each of the plurality of capcodes written to the capcode memory corresponds to one of the services to be executed; the transfer means replaces any capcode or capcodes indicated by the valid/invalid flag as being invalid with one of the capcode or capcodes indicated as being valid and then transfers the capcodes to the decoder.

The valid/invalid flag is preferably a single-bit flag. However, the invention is not limited to the use of a single-bit flag and the term "flag" as used in this specification encompasses both single- and multi-bit flags.

The invention further provides a multi-capcode pager constituted in the foregoing manner, in which: the transfer means is constituted as a microcomputer, and the decoder is an integrated circuit, separate from the microcomputer, which, in order to execute the comparison of the demodulated address data against the plurality of capcodes in parallel, has a number of comparators equal to the number of capcodes.

The invention further provides a multi-capcode pager in which the valid/invalid flag memory constitutes one portion of an EEPROM, and the other portion of the EEPROM constitutes the capcode memory.

In a specific embodiment of the invention, the pager further includes a microcomputer provided as a controller which, based on the coincidence signal from the decoder and the valid/invalid flag read from the valid/invalid flag memory, detects which of the valid capcode or capcodes in the capcode memory matches the address data, and controls the execution of the paging service corresponding to the capcode thus detected.

These and other objects and advantages of the invention will be made more apparent from the following description and drawings.

DETAILED DESCRIPTION OF PREFERRED EMBODIMENT

An embodiment of the invention will now be explained with reference to the drawings.

Figure 3:
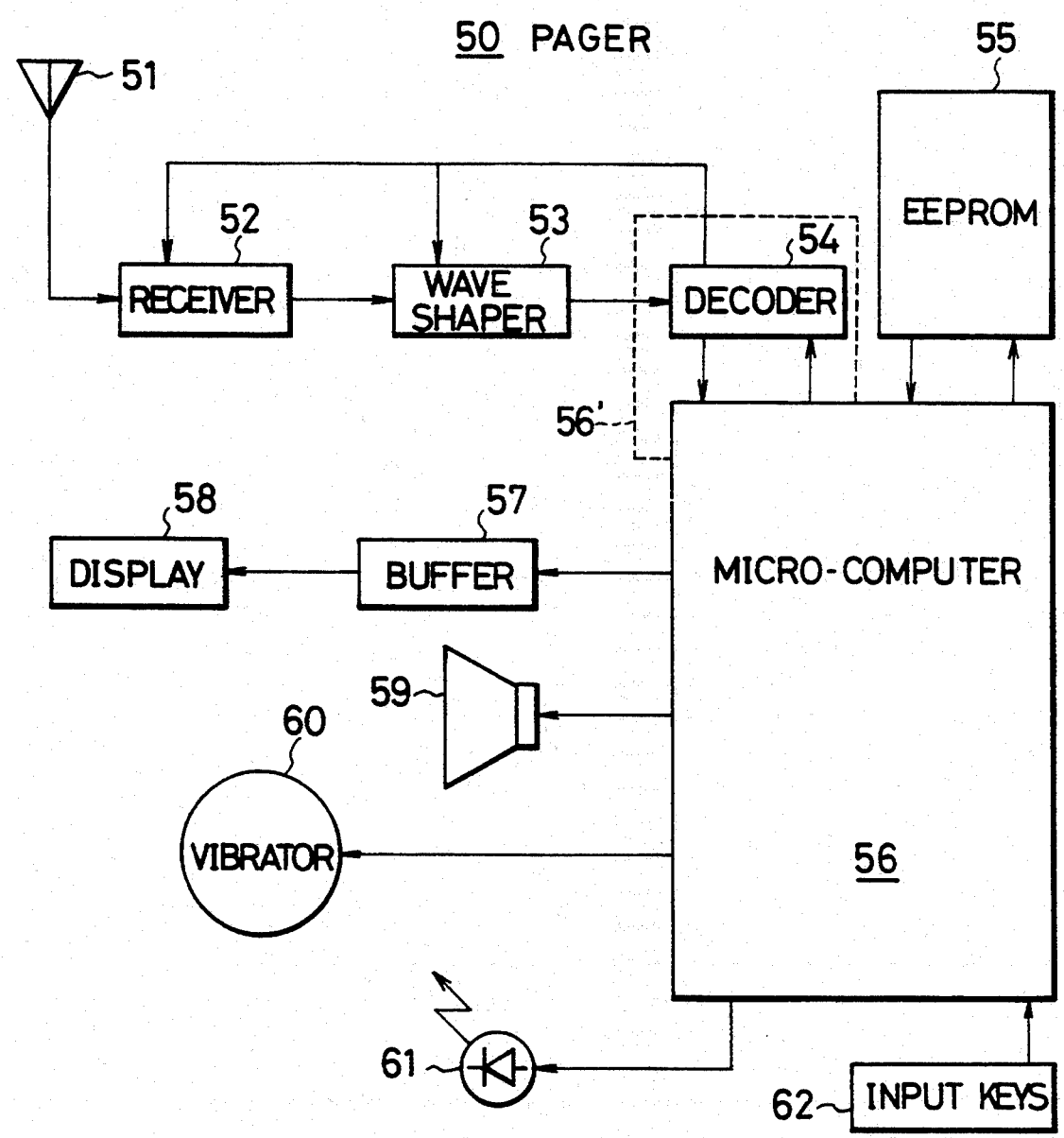
FIG. 3 is a functional block diagram schematic of a pager suitable for implementing the principles of the present invention.

FIG. 3 shows a sample configuration of a multi-capcode pager as an example of communication receiving equipment suitable for implementing the principles of the present invention. The illustrated pager 50 is intended to comply with the POCSAG coding protocol, so the explanation regarding the basic operation and POCSAG format given in the prior art example give above applies nearly without modification. Except for the portions characteristic of the present invention, the configuration and operating principles of any type of existing or possible future pager can be adopted.

The pager 50 shown in FIG. 3 has a receiver 52 that receives a radio signal of a prescribed frequency which excites its antenna 51. The waveform of the signal received and demodulated by the receiver 52 is modified by a wave shaper 53, and made into a wave train or data stream which can be recognized as a binary logic signal. The wave shaper 53 is also called a digital detector or simply a detector, and its output is applied to a decoder 54. In the illustrated pager, the decoder 54 is implemented as an independent piece of hardware, being provided as an integrated circuit (IC) module which accepts clock input (not shown) and includes time measurement functions. The decoder 54 generates a control signal for supplying power from a battery (not shown) to the receiver 52 and wave shaper 53 periodically at a time interval $\Delta T$. As described in FIGS. 1 and 2, this intermittent operation is a battery-saving technique. The decoder 54 in this preferred embodiment also generates a control signal for changing the operating mode of a microcomputer 56, used in this preferred embodiment as a controller, such that when the supply of battery power to the receiver 52 and wave shaper 53 is halted, the microcomputer 56 is put into low clock mode, thereby reducing the power consumption of the microcomputer 56. Accordingly, during this time interval ΔT, the decoder 54 essentially functions as the control means for various functions required in that period.

The microcomputer 56 is coupled to a PROM, or more preferably an EEPROM 55 as illustrated in the diagram, which contains information required for the operation of the pager 50. To describe only the portions of this memory means that are of particular relevance to the present invention, as shown in detail in FIG. 5, the memory means is provided with a plurality of capcode memory slots containing a plurality of capcodes, each with a corresponding memory slot that contains a valid-/invalid flag which indicates whether the capcode written to the corresponding capcode memory slot is valid or invalid. Again for the purpose of reducing power consumption, each capcode and each valid/invalid flag is read only once by the microcomputer 56 when the power switch (not shown) is turned on. As described in detail later, after the data replacement process according to the invention is selectively implemented, each capcode read from memory is transferred to a memory area used exclusively for the second data input of the decoder 54, and then stored in a memory area (normally RAM, not shown) attached to the microcomputer 56.

A display buffer 57 which drives a display 58 and three types of alert means, namely a speaker or beeper 59 that generates beeps, a vibrator 60 constituting a motor or the like, and a light-emitting diode or other lamp means 61 that is able to generate light, are also connected to the microcomputer 56, as are input keys 62, and the operation and functions of these components are as described previously. As a general rule, these components and their operation need not be directly modified by the present invention. As described above, some pagers may omit the lamp means 61 or other alert means. Alternately, some pagers may include all of the alert means 59, 60, and 61, but to suit the user's preferences, the EEPROM 55 contains information in rewritable form indicating which alert means is to be actuated.

As the receiver 52 cycles between the on and off states at the prescribed time interval ΔT, if the preamble is detected by the receiver 52 when in a stable activated state, the receiver 52 remains in the on mode and next receives the synchronization data Sc. However, some commercially available pagers do not detect the preamble per se, but rather, they detect a series of bits (e.g., 6 bits) alternating between '0' and '1' (although this logical signal sequence may also appear in message data or the like) and then detect the synchronization data Sc. While this method may naturally be adopted, when synchronization is established by either method, the receiver goes into the off mode until a data frame, e.g, frame #4, previously assigned to that pager 50 is sent, waits until sufficient time has elapsed to receive frame #4, and then goes into the on mode. As described previously, the receiver naturally maintains the on mode while the data in frame #4 is being received, demodulated, and decoded, and then goes back into the off mode. However, if the message is long, the on mode is continued during the process of receiving, demodulating, and decoding the remainder of the message data contained in subsequent frame groups, and if necessary, in frames after the synchronization signal for the next batch.

Figure 4:
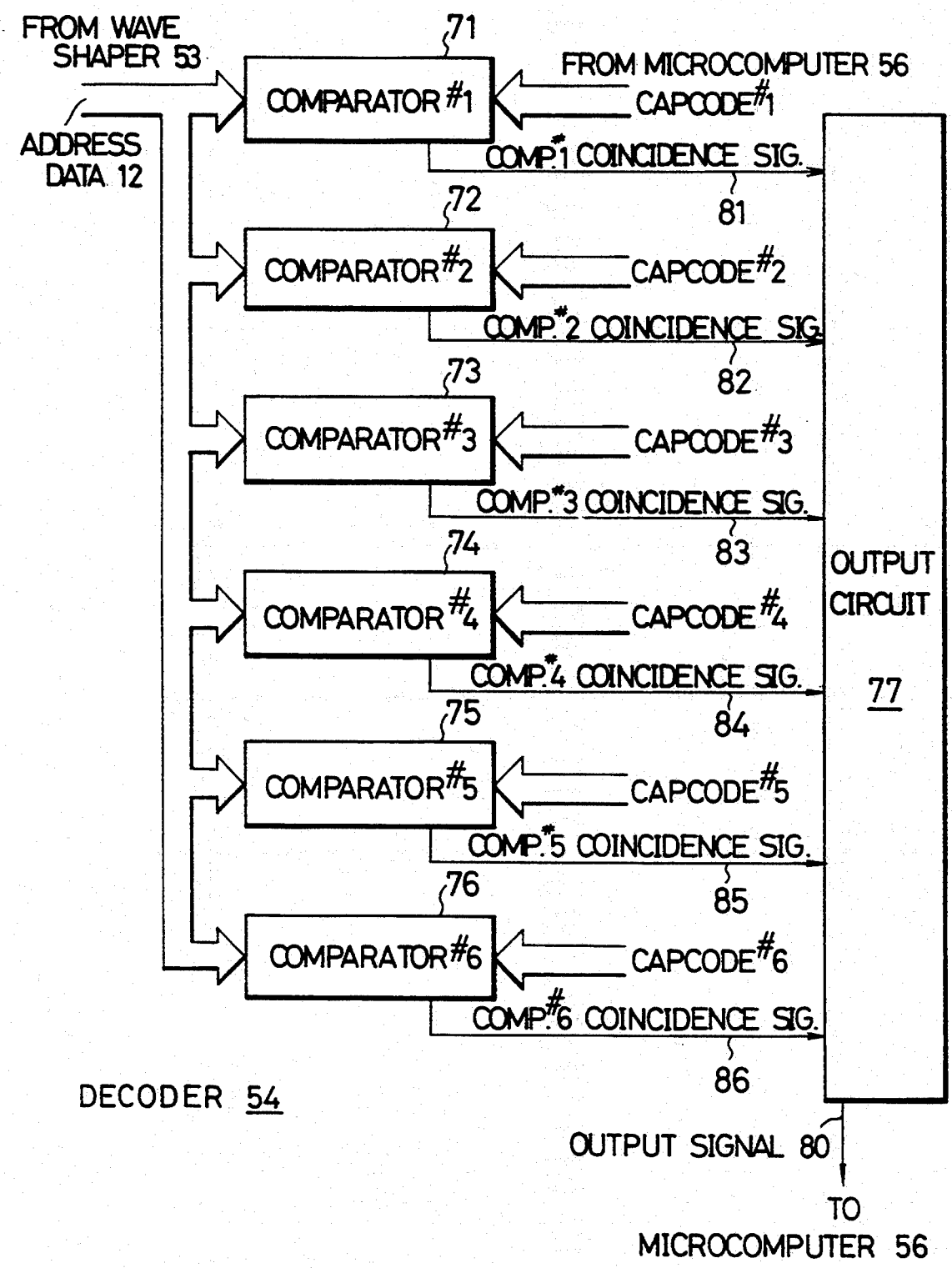
FIG. 4 is a block diagram schematic of a detail of the decoder.

In frame #4, the address data 12 in bits #2 through #19 of the address code word 10 (the first code word shown in FIG. 2, in which the address/message flag 11, which is the first bit of the code word, is set to '0') is demodulated and made into a recognizable binary data stream by the wave shaper 53, given to the decoder 54, and compared against all of the capcodes allocated to the pager 50. FIG. 4 shows the decoder 54 of this preferred embodiment, particularly the portions relevant to this comparison operation; this diagram serves as the basis for the following discussion.

In this embodiment, there are six capcodes from the first capcode #1 through the sixth capcode #6. The comparison of the address data 12 against each of the capcodes is performed in parallel by six built-in comparators 71 through 76. The address data 12 is provided as the first data input to comparators 71 through 76. In the input portion of the decoder 54, a common-knowledge clock sampling technique may be used to transform the address data 12 into a digital waveform which is more desirable as a binary signal sequence. The capcodes 1 through 6 corresponding to the first comparator 71 through the sixth comparator 76 are provided as the second data inputs to comparators 71 through 76 for comparison. However, as described earlier, capcodes 1-6 are read by the microcomputer 56 from the corresponding capcode memory slots in EEPROM 55. As described later, according to the principles of this invention, capcodes 1-6 are subjected to the selective data rewrite process if necessary, and then stored in the prescribed storage area (not shown) for each comparator.

In any of the six comparators 71-76, if the address data 12 matches the provided capcode i ($1 \leq i \leq 6$), a coincidence signal is generated at its output and sent to an output circuit 77. When using the decoder 54 of this embodiment, the coincidence signals from each comparator #i are signals which assume a data format which indicates the corresponding comparator. Namely, if the comparator 1 coincidence signal generated when the address data 12 matches capcode #1 in comparator #1, when expressed as a serial binary signal, takes the value '001', then the comparator #2 coincidence signal will take the value '010', and so on, with the coincidence signal for a comparator being a binary number incremented by one as the number of the comparator increases.

If a coincidence signal appears at any of the six comparators #1-6, then the output circuit 77 sends that coincidence signal as an output signal 80 to the microcomputer 56. The output circuit 77 is also provided with a priority function so that if two or more comparators simultaneously generate a coincidence signal, the output from the lowest-numbered comparator becomes valid, and that coincidence signal is provided as the output signal 80. However, this priority function is not a function mandated by the principles of this invention. However, in consideration of the processing speed and processing capacity of current microcomputers, along with the number of I/O ports and their processing methods, as described later, this priority function can be used effectively together with the parallel comparison process described above. Even without a priority function which follows the technique described above, in the event that two or more comparators simultaneously generate a coincidence signal, the inclusion of a method of selecting one of the coincidence signals can be used conveniently in the implementation of this invention.

If, as a result of the comparison, the address data 12 is not found to match any of the capcodes #1-6, as described previously, the receiver 52 will go into the off mode, and return to its state of periodically turning on. If at least one of the capcodes matches the address data 12, a meaningful output signal 80 is generated by the output circuit 77. Timed to coincide with the completion of at least this comparison decision process, the microcomputer 56 is put into high clock mode by an instruction from the decoder 54, so that the microcomputer 56 can read this output signal 80.

Then, as described previously, the decoder 54 receives the message code word 20 (in which the bit value of address/message flag 21 is '1'), and decodes the message data 22. The decoded data is stored in the attached message memory under control of the microcomputer 56, but the subsequent processing has no direct relevance to the present invention, so it will not be described again.

Figure 5:
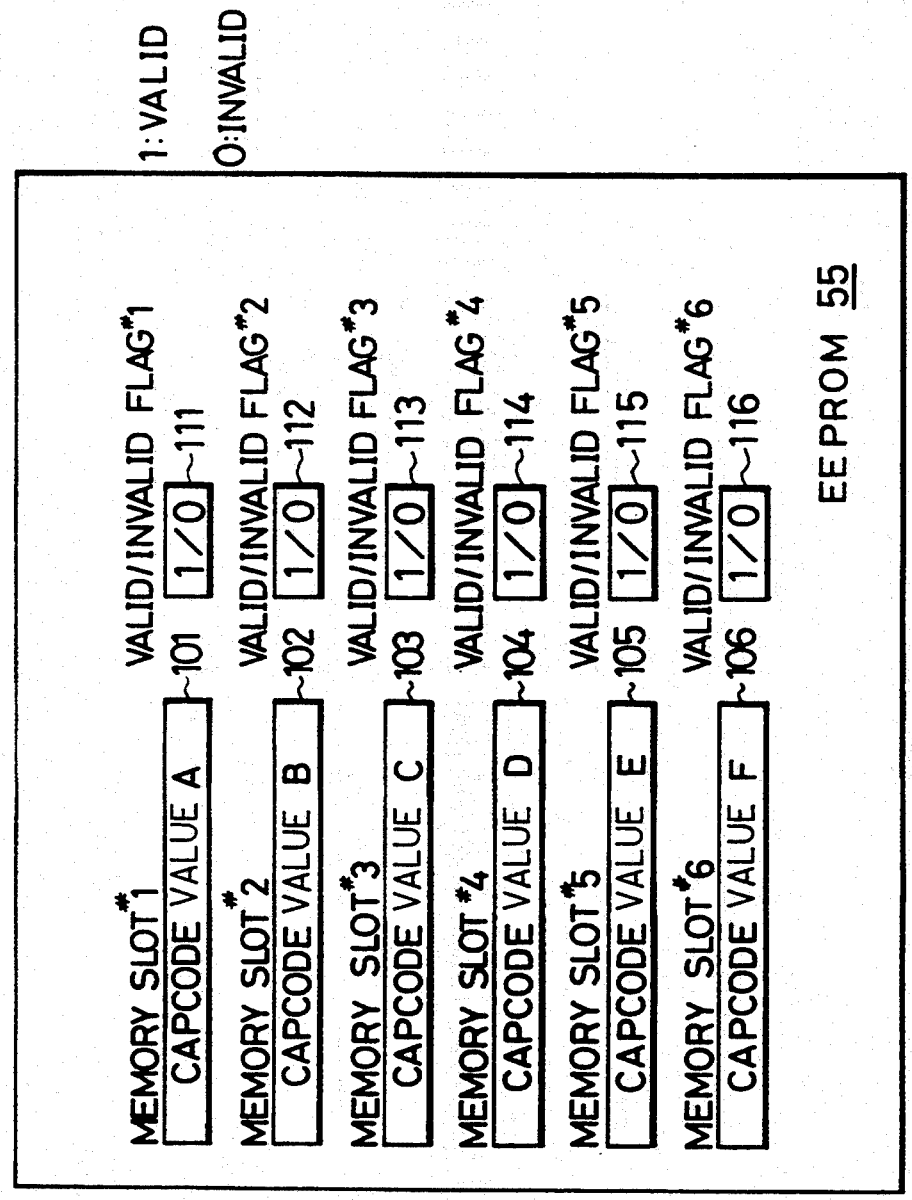
FIG. 5 is a diagram used to describe the capcode memory slots in EEPROM, and the valid/invalid flag for each capcode.

Once the power to the pager 50 is turned on, instead of the capcodes A-F in the six capcode memory slots 101-106 in the EEPROM 55 of FIG. 5 being written to capcodes #1-6 in the prescribed storage areas for comparators 71-76, with the present invention, these capcodes do not necessarily have a one-to-one correspondence. It is in this point that the technique of writing capcodes is fundamentally different than in the prior art. In the prior art, as described previously, all of the capcodes 1-6 to be applied to the comparators in the decoder 54 have a one-to-one correspondence with the capcodes A-F contained in the corresponding memory slots of EEPROM 55. To wit, as shown in FIGS. 4 and 5, if six capcodes are used, then the capcodes are assigned in the manner capcode #1=capcode A
capcode #2=capcode B
capcode #3=capcode C ... Table 1
capcode #4=capcode D
capcode #5=capcode E
capcode #6=capcode F when following only the conventional method. As described already in detail, the capcode or capcodes corresponding to services that the user does not wish to receive are given decimal numeric values of 2,000,000 or greater. However, according to the present invention, this one-to-one correspondence does not necessarily hold. This will now be described in reference to FIG. 6 in more detail.

This invention is particularly characterized in that, in addition to capcode memory slots 101-106, valid/invalid flag slots 111-116 are also provided in the EEPROM 55 to hold valid/invalid flags which make the capcodes A-F contained in capcode memory slots 101-106 valid or invalid. This valid/invalid flag may be, for example, one-bit Boolean data which may take a logical value of '1' to make the corresponding capcode valid, or a logical value of '0' to make the capcode invalid. Making the capcode valid can be considered to be simply turning the capcode 'on'. Making the capcode invalid is the same as turning it 'off'. As described earlier, in this type of pager, when the address data 12 provided to the decoder 54 matches the first capcode, a certain paging service is executed, or if the second capcode is matched, a different paging service is executed, and so on, with the paging service to be executed determined by the number of the capcode. Under these conditions, the valid/invalid flag adopted in this invention is a flag that specifies whether or not the corresponding paging service is to be executed or not when the address data 12 matches the corresponding capcode. Thus, only when the logical value of the flag indicates "valid" (e.g., when it is '1') is that paging service executed, and when "invalid" is indicated, the service is not executed.

Figure 1:
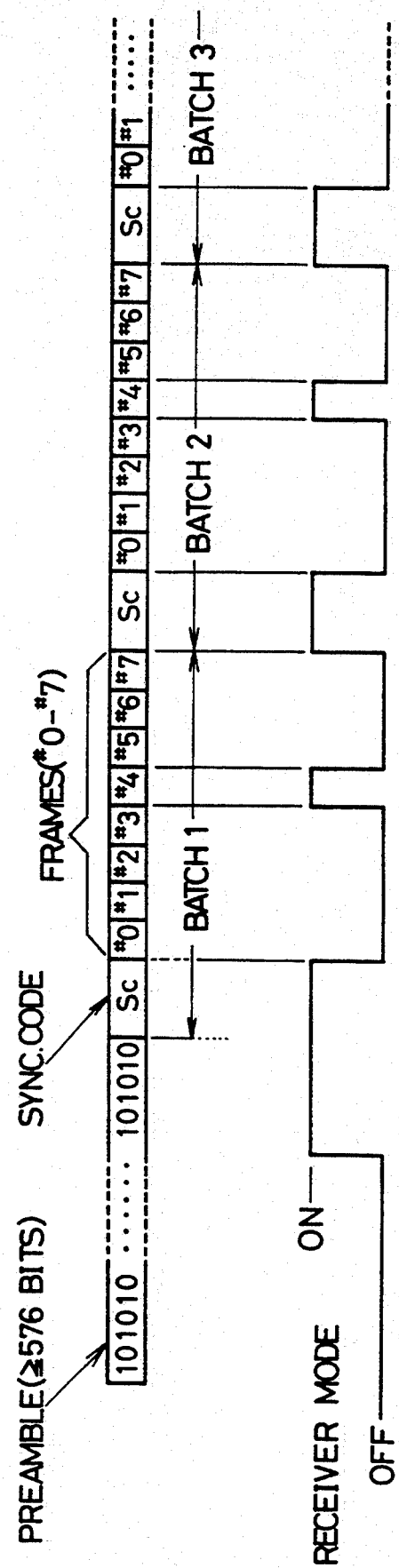
FIG. 1 is a diagram of a time-based digital representation of a radio signal transmission in accordance with the POCSAG coding protocol, and an example of the intermittent operation of the receiver of a pager.
Figure 2:
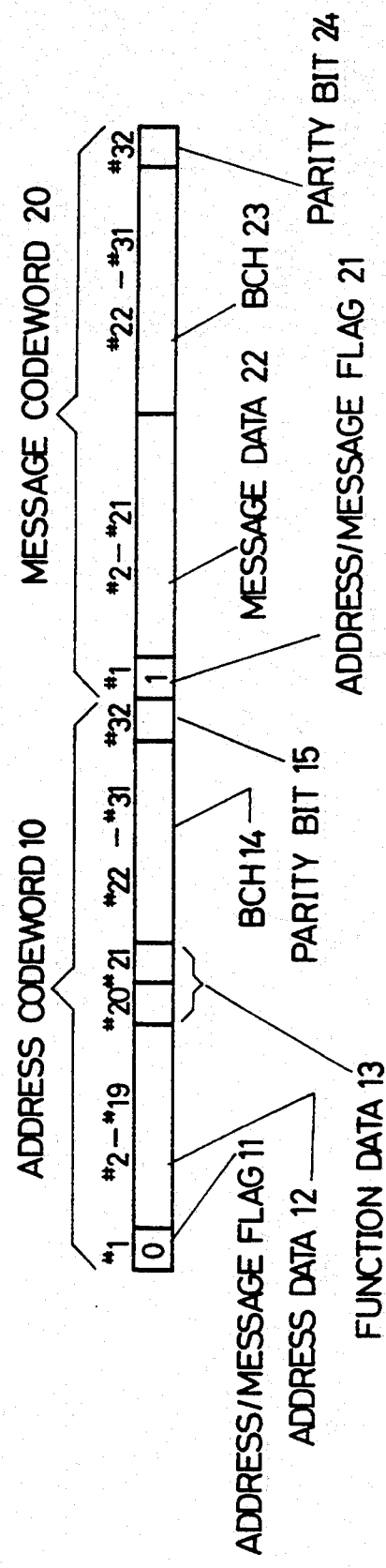
FIG. 2 is a representation of the data stream in a particular frame.

In this invention, even if the capcodes A-F stored in all capcode memory slots 101-106 from capcode memory slot 1 through capcode memory slot 6 may include capcodes corresponding to services not desired by the user, valid capcodes required to execute all paging services are written as capcodes A-F. Herein, we shall assume that pager 50 checks frame #4 as shown in FIG. 1, so capcodes A-F are selected from the group of decimal values which when divided by 8 give a remainder of 4 (8m+4; where m is an integer greater than or equal to 1). For example, the group capcode A=8×2+4=20
capcode B=8×4+4=36
capcode C=8×6+4=52
capcode D=8×8+4=68 ... Table 2
capcode E=8×10+4=84
capcode F=8×20+4=164 would be valid. Once again, these capcodes are concrete examples of decimal numbers to be assigned for each paging service when executing all of the paging services planned for that pager 50.

Figure 6:
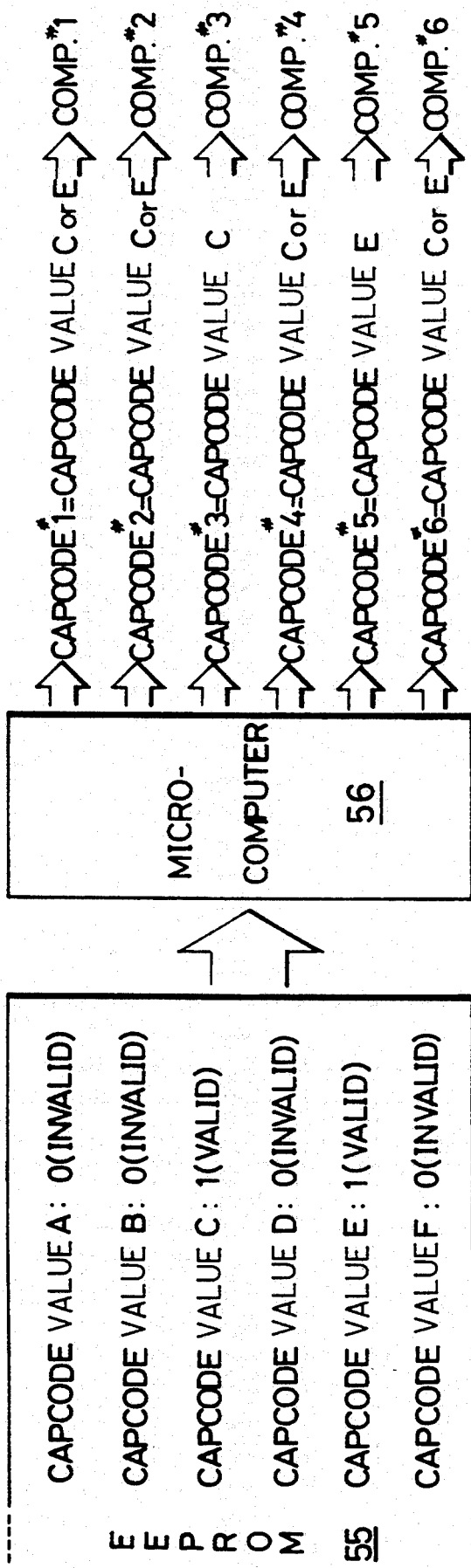
FIG. 6 is a diagram used to describe the operation of the microcomputer which is one example of transfer means transferring the individual capcodes stored in capcode memory slots in the EEPROM to the comparators within the decoder, after the capcodes have been replaced according to the principles of this invention.

However, say the user does not wish to receive all of these paging services, but rather wishes to receive, for example, only the paging services corresponding to the third capcode C and the fifth capcode E and does not want the rest of the paging services. In this case, following the data setting technique of this invention, of the valid/invalid flag slots 111-116 for capcode memory slots 1-6, a '1' indicating valid data is written to the third and fifth valid/invalid flag slots 113 and 115, and '0' is written to the other valid/invalid flag slots. This correspondence is illustrated in the EEPROM 55 of FIG. 6. Based on this correspondence, in the present invention, when the power switch (not shown) of the pager 50 is turned on and the capcodes A-F contained in the capcode memory slots of this EEPROM 55 are transferred by transfer means (the microcomputer 56 in this preferred embodiment) to the corresponding comparators #1-6 in the decoder 54, the capcode or capcodes indicated as being invalid (in this case, these are the four capcodes numbered 1, 2, 4, and 6) are replaced by at least one of the capcode or capcodes indicated as being valid (in this case, this is the third capcode C or the fifth capcode E) and then transferred. The result of this replacement, as shown in FIG. 6, is that the capcodes #1-6 actually transferred to comparators #1-6 in the decoder 54 become capcode #1=capcode C
capcode #2=capcode C
capcode #3=capcode C ... Table 3
capcode #4=capcode C
capcode #5=capcode E
capcode #6=capcode E in this case. As described above and as shown in FIG. 6, capcodes #1, 2, and 4 are replaced with capcode C (although they could be replaced with capcode E) and capcode #6 could also be replaced with capcode C. When software-controlled means such as the microcomputer 56 in the diagram is selected as the transfer means, it is preferable to decide upon a specific replacement convention, such as when one of the capcodes within the capcode memory slots is specified as being invalid, it is replaced with the closest valid capcode above or below it.

As this scheme is used in this invention, even if the address data 12 provided to decoder 54 may match one of capcodes A, B, D, or F, since only capcodes C and E for the services desired by the user of this pager 50 are provided to the comparators #1–6, the undesired paging services will not be executed. On the other hand, if the address data 12 provided to the decoder 54 matches capcode C, then according to the replacements in Table 3, the first comparator 71 through the fourth comparator 74 (comparators 71–74) will generate coincidence signals. The decoder 54 used here is equipped with the priority function described previously, so in this case, the output signal 80 provided as output from the output circuit 77 to the microcomputer 56 is the signal indicating a match in the comparator with the lowest number, namely comparator #1 indicated with the reference number 71.

However, when the pager 50 was turned on and data was read from the EEPROM 55, the valid/invalid flag for each capcode memory slot was stored in a special memory area, so the microcomputer 56 is able to consult this data whenever needed. Accordingly, even if an output signal 80 indicating a match in comparator #1 were to be received, the microcomputer 56 is able to determine that capcode A is invalid, that this capcode A was replaced with capcode C, and that capcode C was originally assigned to comparator #3, so ultimately, the microcomputer 56 is able to determine that address data 12 prompting the execution of the paging service corresponding to capcode 3 had been received. Accordingly, the decoder 54 and microcomputer 56 are then able to follow the same procedures as those followed in a conventional pager 50, controlling subsequent operations including message decoding, and executing the prescribed paging service corresponding to this third capcode.

In the same manner, if the address data 12 provided to decoder 54 matches capcode E, then according to the replacements in Table 3, the fifth comparator 75 and sixth comparator 76 will generate coincidence signals, and the output signal 80 provided as output from the output circuit 77 to the microcomputer 56 is the signal indicating a match in the fifth comparator 75. In this case, the capcode E applied to this fifth comparator 75 is stored in the corresponding fifth capcode memory slot 105, and the corresponding valid/invalid flag is set to '1' which indicates that it is valid, so the microcomputer 56 is able to determine that this is the original unreplaced capcode, so the decoder 54 and microcomputer 56 implement the subsequent operations including message decoding, and execute the prescribed paging service corresponding to this fifth capcode E.

As is clear from the above description, the present invention has none of the drawbacks evident in the prior art, which accompany the use of a decimal number, anticipated to be not used but which is still the usable range, and thereby using a capcode that does not match the address data corresponding to an undesired paging service, so the risk of malfunctions and data read errors is greatly decreased.

Moreover, by means of the present invention, the modification process for turning on a paging service which had been turned off becomes extremely simple. This is because, when the present invention is applied, regardless of whether or not a user is to use the various paging services, the corresponding capcodes A–F for executing each service are written to the capcode memory slots 101–106. Whether or not the individual paging services are to be executed is determined by the data within the valid/invalid flag slot, which indicates whether or not the capcodes corresponding to the individual paging services are valid or invalid. Accordingly, making an invalid capcode valid, or vice versa, can be achieved by merely rewriting the data in the corresponding valid/invalid flag slot. If this data is simply a one-bit logical value as in the example described above, rewriting this data is obviously extremely simple. In comparison to the prior art, in which the rewrite operation must be performed on all of the most-significant 18 bits of a capcode determined by the 18 most-significant of the total of 21 bits, the superiority of the present invention is clear. In addition, when executing the rewrite operation by means of the "over-the-air" reprogramming method using radio signals, the amount of data which needs to be sent is reduced and the rewrite can be performed faster and more reliably.

The foregoing is a description of a preferred embodiment of the present invention, but as long as the microcomputer 56 has sufficient capacity and speed, as shown by the imaginary line 56' in FIG. 3, the microcomputer 56 may also implement the functions of the decoder 54. In principle, the given address data 12 could be compared against the plurality of capcodes in serial. Naturally, as is clear from the operation described above, even if the decoder 54 does not have a priority output function as described above, if at least one of the comparators finds a match with the address data, as long as the decoder 54 is able to generate output indicating which comparator found a match, or which capcode was found to match, then it will be possible to determine the capcode that matches the address data and is valid at that time. In addition, the transfer means which transfers the group of capcode data in the EEPROM 55, after the selective rewrite process is performed based on the valid/invalid flag, to the decoder 54 can be changed by the service provider from the microcomputer 56 shown in the illustrated embodiment to an external circuit created expressly for this use. Moreover, the capcode memory that stores a plurality of capcodes, and the valid/invalid flag memory that stores the valid/invalid flag corresponding to each capcode need not be provided within the same memory component or memory device as in the EEPROM 55, but rather, their hardware may be implemented in separate memory components or memory devices.

In addition, while the paging services and capcodes have a one-to-one correspondence in the embodiment described above, a plurality of different capcodes may correspond to the same paging service.

Naturally, the communication equipment to which the present invention may be applied is not limited to the multi-capcode pager of the embodiment described above. Any type of communication equipment which has multiple capcodes and responds when paged using address data that matches one of the capcodes would be suitable for the application of the improvements in this invention.

The present invention is in no way restricted to the illustrated embodiment, as various modifications including the above are permitted as long as they fall within the scope of the patent claim.

What is claimed is:

1. Multi-capcode communication receiver equipment comprising:

a receiver to receive a radio signal and to demodulate a data stream including address data;

a capcode memory to store a plurality of capcodes;

a capcode writing circuit to write said capcodes into said capcode memory;

a valid/invalid flag memory to store a plurality of valid/invalid flags each corresponding to a respective one of said capcodes so as to indicate whether said corresponding one of said capcodes is valid or invalid;

a valid/invalid flag writing circuit to write said valid/invalid flags into said valid/invalid flag memory;

a controller to read out said capcodes from said capcode memory and said valid/invalid flags from said valid/invalid flag memory for determining each of the read-out capcodes as a valid capcode or invalid capcode based on the read-out corresponding valid/invalid flag and then transfer said valid capcode or capcodes to a decoder, and replace, in said controller, said invalid capcode or capcodes with at least one of the determined valid capcodes and then transfer the replaced valid capcode or capcodes to said decoder;

said decoder comparing said demodulated address data with all of the transferred capcodes transferred by said controller to said decoder and generating a coincidence signal when said demodulated address data matches one of said transferred capcodes; and an executing circuit to receive said coincidence signal from said decoder to execute one of a plurality of services corresponding to said one of said transferred capcodes matched with said demodulated address data.

2. The multi-capcode communication receiving equipment as described in claim 1 wherein said controller comprises a microcomputer.

3. The multi-capcode communication receiving equipment as described in claim 2 wherein said decoder is an integrated circuit, separate from said microcomputer, which, in order to execute the comparison of said demodulated address data against said plurality of capcodes in parallel, has a number of comparators equal to the number of capcodes.

4. The multi-capcode communication receiving equipment as described in claim 1 wherein said capcode memory comprises a programmable read-only memory.

5. The multi-capcode communication receiving equipment as described in claim 1 wherein said capcode memory comprises an electrically erasable and programmable read-only memory.

6. The multi-capcode communication receiving equipment as described in claim 1 wherein said valid/invalid flag memory comprises an electrically erasable and programmable read-only memory.

7. The multi-capcode communication receiving equipment as described in claim 6 wherein said electrically erasable and programmable read-only memory comprises the capcode memory.

8. Multi-capcode communication receiving system having a display and annunciation devices controlled by a microcomputer when power is being applied to the system, comprising:

a receiver to receive a radio signal and to demodulate a data stream including address data;

a memory to store a plurality of capcodes and a plurality of valid/invalid flag information, the valid/invalid flag information each being assigned to a corresponding one of the capcodes so as to indicate whether the corresponding capcode is valid or invalid;

a capcode writing circuit to write said capcodes into said memory and a valid/invalid flag writing circuit to write said valid/invalid flags into said memory;

a microcomputer, in response to a coincidence signal, to operate the display and annunciation devices in accordance with said radio signal; and a decoder, adapted to store the capcodes transferred by said microcomputer from said memory, to compare said demodulated address data with all of the capcodes stored therein and to generate the coincidence signal when said demodulated address data matches one of the capcodes stored therein;

said microcomputer, at every time of the power initially applied to the system, determining which capcodes in said memory are to be transferred to said decoder based upon the valid/invalid flag information assigned to the respective capcodes, said microcomputer executing transfer of the capcode to be valid according to the associated valid/invalid flag information to said decoder and inhibiting transfer of the capcode to be invalid according to the associated valid/invalid flag information to said decoder.

9. Multi-capcode communication receiving system having a display and annunciation devices controller by a microcomputer when power is being applied to the system, comprising:

a receiver to receive a radio signal and to demodulate a data stream including address data;

a memory to store a plurality of capcodes and a plurality of valid/invalid flag information, the valid/invalid flag information each being assigned to a corresponding one of the capcodes so as to indicate whether the corresponding capcode is valid or invalid;

a capcode writing circuit to write said capcodes into said memory and a valid/invalid flag writing circuit to write said valid/invalid flags into said memory;

a microcomputer, in response to a coincidence signal, to operate the display and annunciation devices in accordance with said radio signal; and a decoder, adapted to store the capcodes transferred by said microcomputer from said memory, to compare said demodulated address data with all of the capcodes stored therein and to generate the coincidence signal when said demodulated address data matches one of the capcodes stored therein;

said microcomputer, at every time of the power initially applied to the system, determining which capcodes in said memory are to be transferred to said decoder based upon the valid/invalid flag information assigned to the respective capcodes, said microcomputer executing transfer of the capcode to be valid according to the associated valid/invalid flag information to said decoder, inhibiting transfer of the capcode to be invalid according to the associated valid/invalid flag information to said decoder, and executing transfer of redundant capcode or capcodes instead of the capcode or capcodes to be invalid according to the associated valid/invalid flag information to decoder, the redundant capcode or capcodes being identical to one of the capcodes to be valid according to the associated valid/invalid flag information.

* * * * *